US006948085B2

(12) United States Patent
Albrecht et al.

(10) Patent No.: US 6,948,085 B2
(45) Date of Patent: Sep. 20, 2005

(54) METHOD AND DEVICE FOR SYNCHRONIZING PROCESSES WHICH ARE PERFORMED ON A PLURALITY OF UNITS

(75) Inventors: Kai Albrecht, Heidelberg (DE); Ulrich Grimm, Dielheim (DE); Thomas Husterer, Sinsheim (DE); Reinhard Janzer, Bruchsal (DE); Helmut Meyer, Wiesloch (DE); Georg Roessler, Angelbachtal (DE); Andreas Wagner, Graben Neudorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 418 days.

(21) Appl. No.: 09/997,981

(22) Filed: Nov. 29, 2001

(65) Prior Publication Data

US 2002/0111696 A1 Aug. 15, 2002

(30) Foreign Application Priority Data

Nov. 29, 2000 (DE) ........................................ 100 59 270

(51) Int. Cl.[7] ................................................ G06F 1/10

(52) U.S. Cl. ....................... 713/400; 713/501; 713/502; 713/503; 713/600

(58) Field of Search ................................ 713/400, 500, 713/501, 502, 503, 600

(56) References Cited

U.S. PATENT DOCUMENTS 5,077,686 A * 12/1991 Rubinstein .................. 713/501
5,117,442 A * 5/1992 Hall ........................... 375/356
5,321,698 A * 6/1994 Nguyen et al. ............... 714/17
5,479,648 A * 12/1995 Barbera et al. ............. 713/322
5,691,660 A 11/1997 Busch et al.
5,873,307 A 2/1999 Tenfelde et al.
6,535,926 B1 * 3/2003 Esker ......................... 709/248
6,591,370 B1 * 7/2003 Lovett et al. ............... 713/502

FOREIGN PATENT DOCUMENTS

| | | | |
|---|---|---|---|
| DE | 28 12 774 | A1 | 9/1979 |
| DE | 38 03 525 | C2 | 8/1989 |
| DE | 198 22 211 | A1 | 11/1999 |
| DE | 199 10 069 | A1 | 11/2000 |
| EP | 0 327 083 | A2 | 8/1989 |
| EP | 0 747 216 | B1 | 12/1996 |
| JP | 07 281 785 | A | 10/1995 |
| JP | 2 000165 905 | A | 6/2000 |

* cited by examiner

*Primary Examiner*—Rehana Perveen
(74) *Attorney, Agent, or Firm*—Laurence A. Greenberg; Werner H. Stemer; Ralph E. Locher

(57) ABSTRACT

A device for synchronizing processes which run on a plurality of units including a central unit linked with other units via a field bus, includes a device provided in the central unit for producing a system clock, the field bus having a vacant line for distributing the system clock to the other units, and respective multiplication devices located at the other units for multiplying the system clock; and a method of operating the device for synchronizing processes.

17 Claims, 4 Drawing Sheets

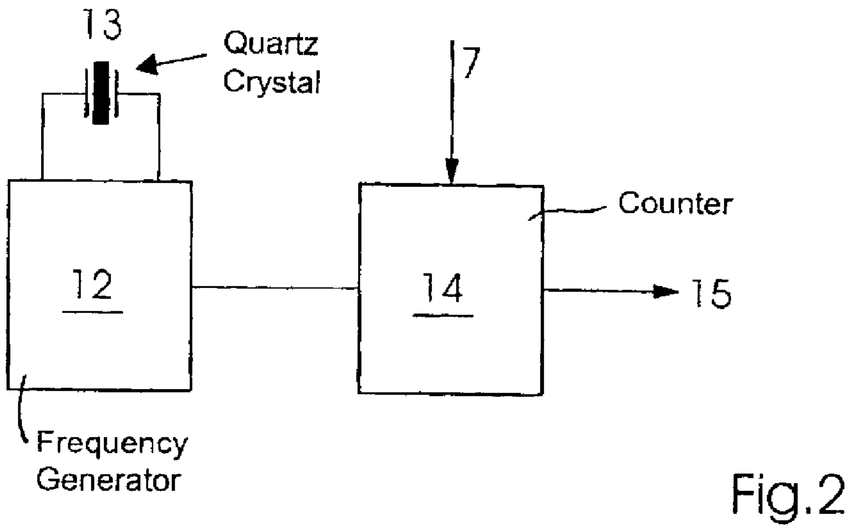
Fig.2
Fig.4
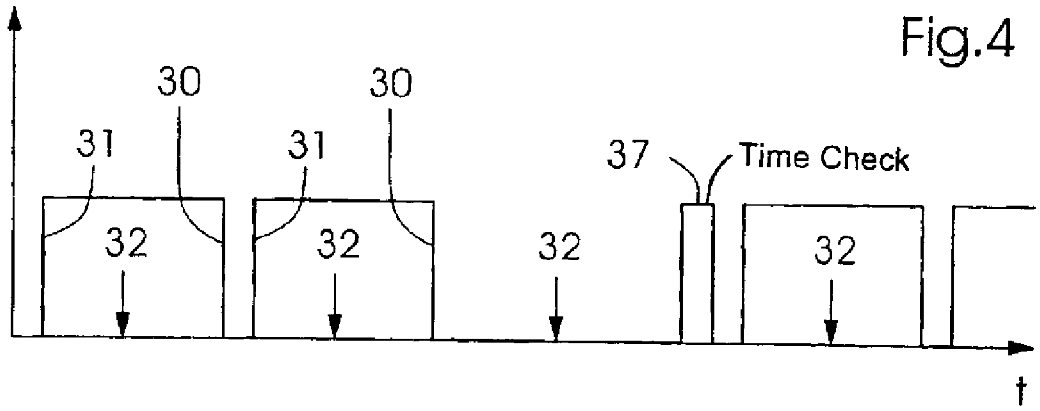

METHOD AND DEVICE FOR SYNCHRONIZING PROCESSES WHICH ARE PERFORMED ON A PLURALITY OF UNITS

BACKGROUND OF THE INVENTION

Field of the Invention

The invention relates to a method and a device for synchronizing processes which are performed on a plurality of units, such as separate processors, and which are coordinated with a system clock of a central unit. This device and this method, respectively, are applied to completed processes at different components of a paper-processing machine.

It has become known heretofore from methods and devices, respectively, usually to send a special protocol via a bus, for synchronizing the different processors with the routing or guide system. Such systems tend to burden the processors time-wise, and additionally require special hardware.

In particular, the published European Patent Document EP 0 747 216 B1 suggests that different units, which have to be supplied with angular-position signals, be connected by two bus systems. In this regard, each unit continually receives the current angle value by one of the bus systems, and by the other bus system, receives information for a switching operation that is to be performed. The nominal or setpoint value of the angle during which the switching operation is to be triggered is stored in a memory of the respective unit.

SUMMARY OF THE INVENTION

Starting with this state of the art, it is an object of the method and the device according to the invention to produce a synchronization of many processes relatively simply.

With the foregoing and other objects in view, there is provided, in accordance with one aspect of the invention, a device for synchronizing processes which run on a plurality of units including a central unit linked with other units via a field bus, comprising a device provided in the central unit for producing a system clock, the field bus having a vacant line for distributing the system clock to the other units, and respective multiplication devices located at the other units for multiplying the system clock.

In accordance with another feature of the invention, the system clock serves for determining at least one value of a machine including rotational speed, acceleration, and angular position of the machine.

In accordance with a further feature of the invention, the at least one determined value is feedable to the further units by a bus system.

In accordance with an added feature of the invention, the multiplication devices have a filtering device.

In accordance with an additional feature of the invention, the multiplication devices have a device for recognizing an absolute time check.

In accordance with yet another feature of the invention, the multiplication devices have a quartz-stabilized frequency generator.

In accordance with yet a further feature of the invention, the multiplication devices serve for producing a module clock for processes taking place in the other units.

In accordance with yet an added feature of the invention, the module clock is adjustable in accordance with the process taking place in the respective other units.

In accordance with yet an additional feature of the invention, the bus system for distributing the system clock is a local bus system.

In accordance with another aspect of the invention, there is provided a method of synchronizing processes which run on a central unit and on other units, with a system clock that has been produced in the central unit and with module clocks that have been produced in the other units, which comprises providing the system clock, which has been produced in the central unit, for synchronizing the module clock which has been produced in the other units.

In accordance with a further mode, the method invention includes, at regular intervals, synchronizing the other units to an absolute time.

In accordance with an added mode, the method invention includes applying the module clock present in the units which are involved, for processes taking place therein.

In accordance with an additional mode, the method invention includes, upon failure of the system clock, driving down the processes led by the module clock, which are conducted through the further involved units.

In accordance with yet another mode, the method invention includes adjusting the frequency of the module clock in accordance with an operation being performed thereat.

In accordance with yet a further mode, the method invention includes determining values of a machine, such as rotational speed, acceleration, and angular position simultaneously with the system clock.

In accordance with yet an added mode, the method invention includes forwarding the determined values together with the determined instant of time to the other units.

In accordance with yet an additional mode, the method invention includes determining the values of the machine by a mathematical model in the involved units after the transmission via the central unit for the time-duration until the transmission of the next current values.

In accordance with a concomitant mode, the method invention includes transmitting an absolute time from a central computer unit to involved computer units, after a defined number of subdivided system clocks.

The device according to the invention is based upon the concept that a central unit assumes the coordination of other different units which are located in the periphery. In this regard, the central unit has the task of synchronizing all of the processes which are performed at the periphery. For this purpose, a centrally produced or created system clock is conducted over a vacant line of a field bus, e.g., a CAN-bus, onto all units taking part in the process. To keep the susceptibility of the system clock to interference at a low level, and to prevent cross talk of this clock signal with other signal lines, the frequency of the system clock is chosen to be relatively low. The clock signal moves, therefore, in a frequency range through which a distribution or dissemination of the clock signal via longer distances is possible. Furthermore, it is possible to debug the arriving system clock by applying suitable filtering measures.

Usually, a faster clock signal is required for a process in the peripheral device than the system clock. That is why the device according to the invention suggests multiplying the system clock arriving in the peripheral device, according to the requirements. The then produced so-called module clock has the desired resolution and is adjustable advantageously to the desired resolution, respectively. Thus, the clock always predominates on the peripheral device, which is required for the respective process.

The device according to the invention provides for a clock generator or transmitter which is integrated into the peripheral devices and is synchronized by the system clock. Between the respective synchronization intervals by the system clock, the clock generator or transmitter runs free. To keep the module clock frequency stable at the peripheral device, another embodiment according to the invention proposes to stabilize the module clock frequency with quartz. Corresponding to an allowed-for drift, which results from the quality of the stabilizing quartz, the time interval of the synchronization interval can be determined.

The creation or production of a local module clock provides the advantage that no danger exists, upon the loss of the system clock created in the central unit, that processes will run uncontrollably and lead to accidents because a harmonization of the independently running processes is no longer possible. To that end, in accordance with the method of the invention, an absence of the system clock is recognized by the processor in the peripheral device which, by the local module clock, consequently drives the process down in a controlled manner until standstill. The required time interval between the absence of the system clock and the controlled downward drive of the process is so short, that the aforementioned drift-off of the module clock from the system clock does not cause any significant problems. That means that all processes which run on the different peripheral devices and which are synchronized with one another using the system clock, are controllably brought to a standstill by the locally created module clock.

A method according to the invention furthermore suggests that, at regular intervals, for example, after every hundredth system clock, a so-called synchronization interval occurs. With this method, a time check occurs at the peripheral device, which adjusts the peripheral device to the absolute time. For the synchronization interval, all peripheral devices receive a so-called time stamp for a time adjustment to absolute time. Due to the distribution of this information, each peripheral device can adjust the processes thereof to the running machine, which means that running processes can be kept in synchronism by using corrective measures, or starting processes can be started at the correct instant of time, and at the correct angular position of the machine, respectively.

Furthermore, all peripheral devices receive, for example, via CAN bus systems, the following values and the instant of time at which the values are determined, which are relevant for the control of a paper-processing machine:

Revolutions-per-minute $v(t)$;

Acceleration $a(t)$;

Current angular position $f(t)$;

If necessary, further values from generators or transmitters, like paper arrival signals of a feeder, for example.

With the simultaneous information regarding the instant of time at which the value is determined, the peripheral device is in a position to calculate the transmitted value by extrapolation at any point in time whatsoever between two transmitted values. This means that because of the time delay in the transmission of the values, the problem already results, that upon the receipt of the values, they are no longer current. With the device and the method, respectively, according to the invention, the advantage results, that it is virtually inconsiderable as to how long the transmission of the values take, because the current value can always be determined.

An additional advantage is that the starting time of an on-running process between two transmitted values can be computed exactly by the aforementioned extrapolation. For example, the peripheral device receives the current angular position of the machine through the transmission of the values, e.g., $\phi=270°$, the speed v=8000 revolutions/hour, and the acceleration a=0. The participant is to trigger an event with an angular position of $\phi=278°$ and is to start a process, respectively. With the received values, the participant can calculate the time, until the machine has reached the angular position of $\phi=278°$. By its own time-base and the module clock, which has, with the receipt of the last system clock, been synchronized therewith, respectively, the ensuing result can be triggered, without requiring any time-synchronous assignment from the central unit. Such an angle-dependent event can be triggered from any peripheral device, without requiring direct cabling with a central incremental transmitter. This, on the one hand, saves cabling cost, and, on the other hand, provides for a lower susceptibility to interference.

If for any reason at all it is not possible to read-in the actual values of the motor at the time of the system clock, they can then also be read in at any other instant of time. Subsequently, the actual values are either counted backward or forward, by extrapolation, to the instant of time, when a system clock was present and is present, respectively.

For the synchronous control of additional drives, which run separately from the main drive, the method according to the invention suggests the following different mode:

The additional drive is equipped with its own setpoint or nominal generator. This setpoint generator computes the setpoints or nominal values for the additional drive. Corresponding to the dynamic requirements of the additional drive, scanning cycles are defined, during which the actual values of the additional drive are read in, and by the different control algorithms, new setpoints or nominal values are provided. The actual values of the main drive are sent at discrete instants of time (for reasons of bus-loading), the frequency of which is, however, lower than the scanning cycles of the additional drive. Due to the instants of time at which the actual values of the main drive are determined, that are each time sent therewith, the further course of the actual values of the main drive at the additional drive can be determined by calculation for every instant of time (interpolation/extrapolation).

An additional application of the device and the method, respectively, according to the invention, is that different motors which run in synchronism with one another are not controlled according to the actual values of a main drive, but by a central instruction-specification. This means that the central unit prescribes instructions for all the drives taking part in the process. If drives in a revolution-correlation run, for example, at half revolutions, one third revolutions or also double revolutions, a setpoint or nominal-value generator in the peripheral device provides for the creation or production of suitably matching or corresponding setpoints or nominal values. All the motor-regulators oe controls then work according to the same algorithm and always read in the actual values of the motors at the exact same instant of time. This instant of time corresponds to the system clock or pulse. Thus, all of the motors are controlled on one virtual electronic shaft.

Other features which are considered as characteristic for the invention are set forth in the appended claims.

Although the invention is illustrated and described herein as a method and a device for synchronizing processes which are performed on a plurality of units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 2 is a block diagram concerned with a multiplication unit;

FIG. 4 is a timing diagram concerned with the course of a system clock; and

DESCRIPTION OF THE PREFERRED EMBODIMENTS

Figure 1:
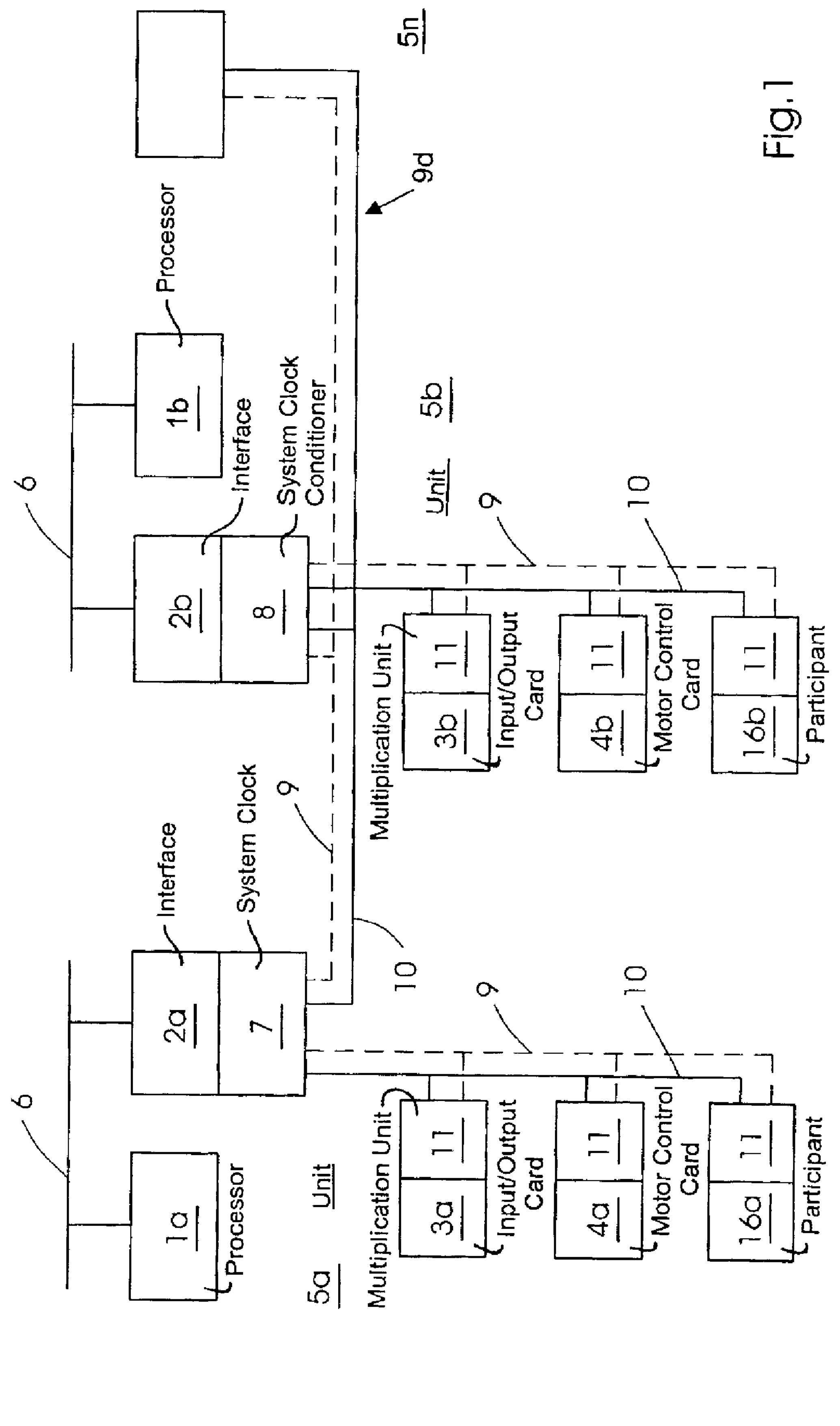
FIG. 1 is a block diagram of a network of different processors.

Referring now to the drawings and, first, particularly to FIG. 1 thereof, there is shown therein a network or cross-linking of two processors 1*a* and 1*b*. The processors 1*a* and 1*b*, respectively, combined with respective interfaces 2*a* and 2*b* and respective input/output cards 3*a* and 3*b* connected thereto, and respective motor control cards 4*a* and 4*b*, form respective units 5*a* and 5*b*. The respective local components, like the processor 1*a* and the interface 2*a*, or the processor 1*b* and the interface 2*b*, respectively, are connected to one another by a VME bus system 6. A system clock 7 is located furthermore on the interface 2*a*. This system clock 7 is passed on to the input/output-card 3*a*, which is located in the periphery, and to the motor control card 4*a*, by a vacant line 9, for example, a CAN bus system. The number of the input/output-cards 3*a* and the number of the motor control cards 4*a*, respectively, is insignificant, in this regard. Via an additional line 9, which is assigned to the CAN bus system 10 as a vacant line, the system clock is passed on to the interface 2*b* of the unit 5*b*. A system clock conditioner or preprocessor 8 is located on the interface 2*b* and, for example, contains a filter or an amplifier. The line 9 then also passes on the system clock 7 from the interface 2*b* to the input/output card 3*b* and the motor control card 4*b*, which belong to the unit 5*b*. By participants 16*a* and 16*b*, the use of which is not defined, the input/output-card 3*b* and the motor control card 4*b*, respectively, which are also characterized as participants, are broadened. By the same token, the number of interfaces 2*a* and 2*b* per respective unit 5*a*, 5*b* can also be greater than shown in this example. The system clock 7 is furthermore being made available via the local VME bus system 6*a*, 6*b* to all local components 1*a* and 1*b*, and 2*a* and 2*b*, respectively, which belong to the respective units 5*a* and 5*b*. Via a line 9*d*, further units 5*n* are connectable to the system clock 7.

Tasks are executed at the input/output-card 3*a* and 3*b*, and the motor control card 4*a* and *b,* which require a time resolution that is finer than what the system clock 7 makes available.

That is why additional multiplication units 11 are required in those cards 3*a*, 3*b*, 4*a* and 4*b*. The multiplication unit 11 has the task of multiplying the resolution corresponding to the required factors. This can be effected, for example, by an embodiment according to FIG. 2.

FIG. 2 is a block-diagram of a multiplication unit 11 as is present on the different input/output cards 3*a* and 3*b* and motor control cards 4*a* and 4*b*. A clock with a frequency of 1 MHz, for example, is generated in a frequency generator 12. A quartz crystal 13 is assigned to the frequency generator 12 for stabilizing the frequency. A counter 14 is connected to the frequency generator 12. The counter 14 is started and set back, respectively, with the system clock 7. If the system clock 7 shows, for example, a clock frequency of 1 MHz, the counter 14 will then count from 0 to 999 within one period of the system clock 7, and continually repeat this procedure. More accurately described, this means that the pulses of the frequency generator 12 are so-to-speak switched-through for the case wherein they are synchronous with the system clock 7.

If there is no exact synchronization between the pulses of the frequency generator 12 and the system clock 7, it may lead to the circumstance that the last of 1000 pulses is either shortened somewhat if the counter 14 is prematurely set back, or if the latter remains in line somewhat longer, because the counter 14 stops counting at 999. The synchronized module clock 15 of the input/output card 3*a* and 3*b*, and the motor control card 4*a* and 4*b*, respectively, are made available at an output.

Figure 3A:
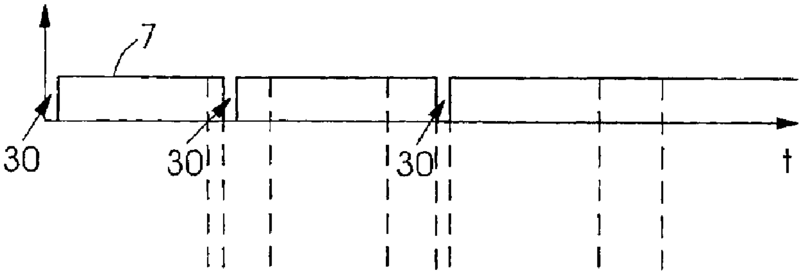
FIG. 3*a* is a timing diagram of a system clock.
Figure 3B:
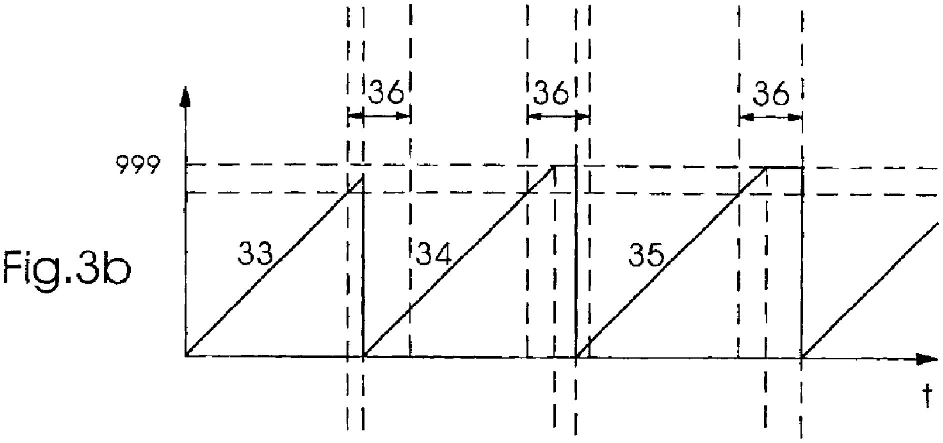
FIG. 3*b* is a timing diagram of a counting operation.
Figure 3C:
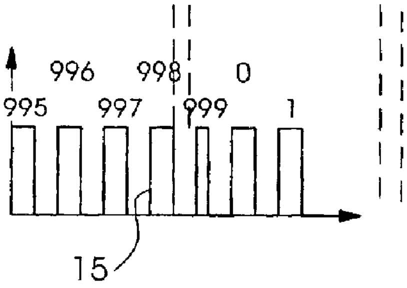
FIG. 3*c* is a timing diagram of a fine resolution of a module clock.
Figure 3D:
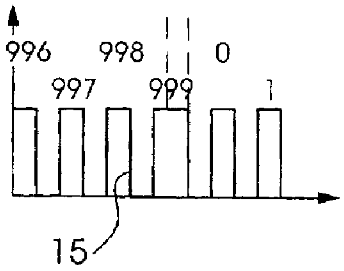
FIG. 3*d* is a further timing diagram of a fine resolution of a module clock.
Figure 3E:
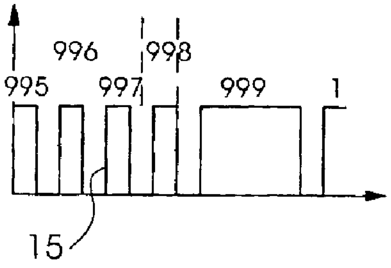
FIG. 3*e* is another timing diagram of a fine resolution of a module clock.

In FIGS. 3*a* through 3*e*, several diagrams are displayed which show the system clock 7 (FIG. 3*a*), the ramp-function of the counter 14 (FIG. 3*b*) and a fine resolution of the module clock (FIGS. 3*c*, 3*d* and 3*e*). The diagram according to FIG. 3*a* shows the system clock 7, whereby in the diagram according to FIG. 3*b*, the ramp-function of the counter 14 is always started with the downward sloping side 30 of the system clock 7. As mentioned hereinbefore, the counter 14 counts within a period from 0 to 999, which lies respectively between the downward sloping sides 30 of the system clock 7.

Ramp functions 33, 34 and 35, respectively, exhibit a different behavior, which can be explained by using the diagrams according to FIGS. 3*c*, 3*d* and 3*e*. Thus, one can see in FIG. 3*c* that the last counting pulse 999 is narrower than the preceding pulses. This is explainable by the fact that the frequency of the module clock 15 is slightly slower than a thousandth of the system clock 7. The 999th counting pulse is then corrected by the system clock 7, which leads to a synchronization.

The diagram according to FIG. 3*d* illustrates the case wherein the module clock 15 is slightly faster in comparison with the system clock 7 than a thousandth of the system clock 7. Because the counter 14 does not increase the counter reading thereof at 999, the last counter pulse 999 remains for as long as the setback of the counter does not yet take place due to the downward sloping side 30 of the system clock 7. Likewise, a correction and synchronization, respectively, thus results again. The diagram according to FIG. 3*e* illustrates another example. After the counter reaches the reading 999, the counter is not set back by the system clock 7, because the latter has failed, for example, however, the counter is set back because a prescribed timeframe 36 has been exceeded. This timeframe 36 is started for a defined counter reading, such as 990, for example, and ends, for example, 10 μs after reaching the counter reading 999. Thus, a compulsory setback of the module clock 15 occurs which, at the same time, has as a consequence, that the processes cycled by the module clock 15, starting at the instant of time at which the system clock 7 is first absent, are controllably brought to a standstill.

The effect of the timeframe 36 is like that of a filtering. For example, a linking of the timeframe 36 with the system clock 7 can be achieved by an AND-gate, whereby a cut or switch-through of the system clock 7 is possible within the timeframe 36. Interference signals which are present on the line of the system clock 7 are ignored outside the timeframe 36.

FIG. 4 is a timing diagram extending over the course of a section of the system clock 7. The clock frequency of the system clock 7 is at 1 kHz, for example, and exhibits an uneven scanning relationship. Only 50 μs, for example, after a downwardly sloping side 30, a rising side 31 appears. Thus, an advantage results in that the participants 2*b*, 3*a*, 3*b*, 4*a* and 4*b* can start a measuring cycle 32, for example, 550 μs after the descending side 30, and that the measuring clock 32 is, as a rule, located in the high state of the system clock 7. With the started measuring clock 32, the participants 2*b*, 3*a*, 3*b*, 4*a* and 4*b* devote their attention to recognizing when the next system clock 7 is coming. Every 100 ms, i.e., after every one-hundredth system clock 7, a so-called time check 37 occurs. This time check is recognized by the fact that no high state of the system clock 7 prevails any longer, 550 μs after the descending or downwardly sloping side 30. The participants 2*b*, 3*a*, 3*b*, 4*a* and 4*b*, respectively, thus recognize that it is the announcement of the time check 37. With this time check 37, each participant 2*b*, 3*a*, 3*b*, 4*a* or 4*b* receives an exact indication of the time that has passed since the machine was turned on (absolute time). The advantage thereof is that participants which have cut or switched-in later, i.e., belatedly, while the machine is already running, are always notified of the absolute time of the machine. Each participant 2*b*, 3*a*, 3*b*, 4*a* or 4*b* can then execute an event, which refers to the absolute time, without having to get an instruction therefor from the central unit 5*a*.

Figure 5:
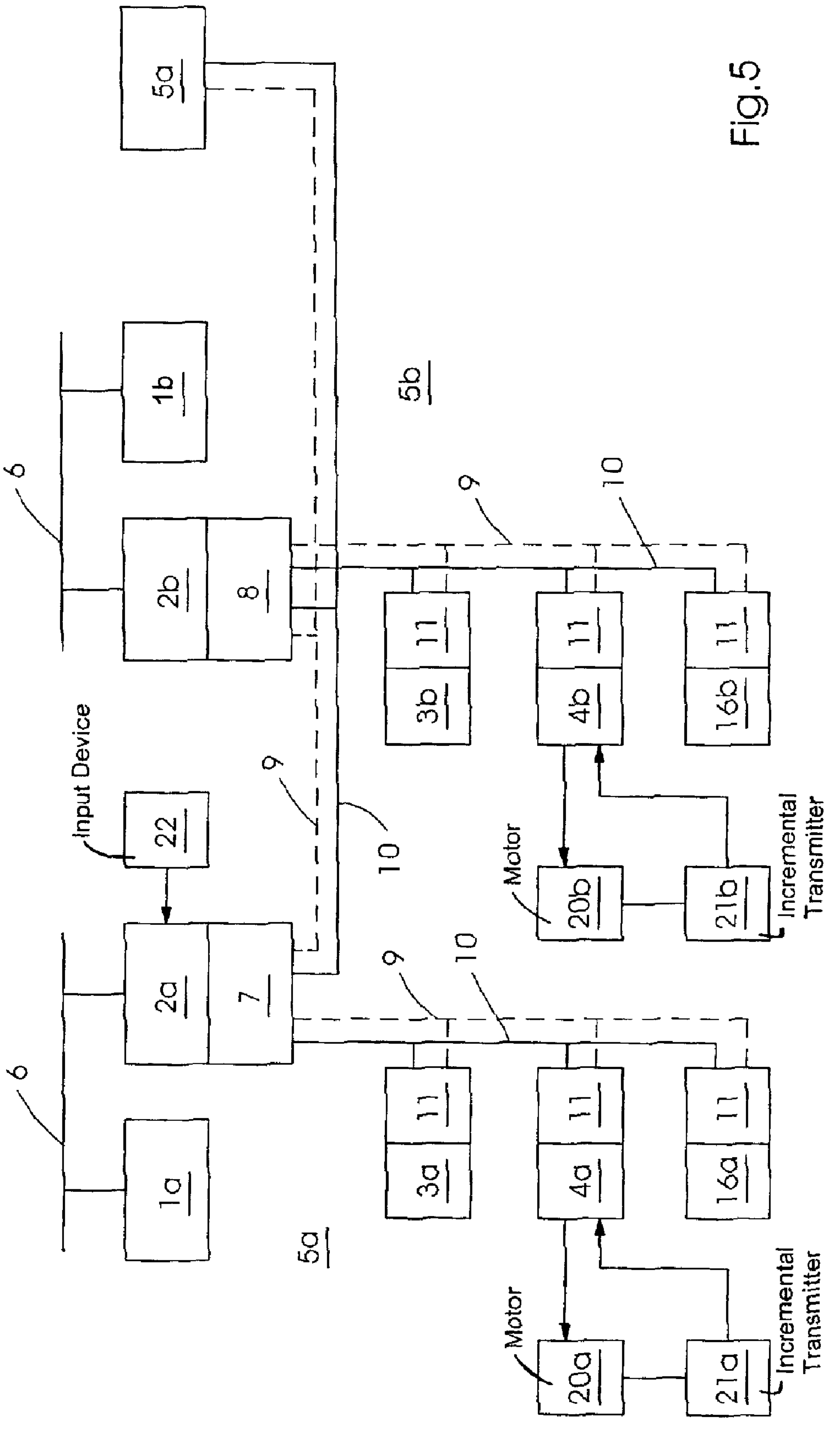
FIG. 5 is another view of FIG. 1 with additional motor control.

FIG. 5 is a block diagram depicting the control of two motors, and is expanded in comparison with FIG. 1 in that a respective motor 20*a*, 20*b* and an incremental transmitter 21*a*, 21*b* have been added to the motor control card 4*a*, 4*b*. Furthermore an input device 22 for introducing inputs by the operator of the machine is added to the interface 2*a*. The motor 20*a* might, for example, be the main motor, which is responsible for the revolving motion of the cylinders of a printing press. This motor 20*a* is controlled in the following manner:

With the aid of the input device 22, the operator of the machine enters a value for the rotational speed or revolutions per minute. This value is fed into the motor control card 4*a* using the CAN bus system 10, and the motor control card 4*a* determines and adjusts therefrom the driver values (current setpoints) for the motor 20*a*. The incremental transmitter 21*a* is located at the motor 20*a*, which either directly sits on the motor shaft of the motor 20*a* or at an appropriate position of a gear transmission and a gear train, respectively, which is driven by the motor 20*a*.

Pulses of the incremental transmitter 21*a* are read in by the motor control card 4*a*. The reading-in procedure always takes place at an instant of time of a system clock 7. From these pulses, the rotational speed or rpm, the acceleration and the angular position of the motor 20*a* are calculated in the motor control card 4*a*. Those calculated values serve, on the one hand, for regulating the motor 20*a*, and on the other hand, those values are always communicated to all other participants 3*a*, 3*b* and 4*b* together with the recording time. Due to the thus-furnished recording time, it is insignificant whether the data is transmitted rapidly or at a given instant of time or whether all of the participants receive the transmitted data at the same time.

The motor control card 4*b* which, for example, has received the task from the processor 2*b* of operating the motor 20*b* in synchronism with the motor 20*a*, also receives those values. Such a task is converted in the motor control card 4*b* by a so-called command interpreter. The motor control card 4*b* then gets the values, revolutions per minute or rotational speed, acceleration, and angular position of the motor 20*a*, transmitted in regular intervals. From these values, the setpoints or nominal values for its own motor 20*b* are computed.

The time interval between two transmissions of the values of rotational speed, acceleration, and angular position of the motor 20*a*, respectively, with the corresponding indication of the instant of time that they are determined or recorded is possibly too great for a synchronization maintenance of two motors 20*a* and 20*b*, so that an interpolation occurs in the interim. This interpolation is performed on the motor control card 4*b* and, by these interpolated values, the setpoints or nominal values are computed for the motor 20*b*.

Furthermore, a multiplication unit 11 for producing a module clock 15, according to FIG. 2, is located on the motor driver or control card 4*b*. The resolution of the module clock 15 is measured so that the operations which run on the motor drive or control card 4*b* (interpolation of the course of the motor 20*a*, read-in of the pulses of the incremental transmitter 21*b*, computation of the actual values of the motor 20*b* from the pulses of the incremental transmitter 21*b*, calculation of new setpoints or nominal values for the motor 21*b*, and so forth) are all taken into consideration from an optimal time standpoint.

We claim:

1. A device for synchronizing processes which run on a plurality of units including a central unit linked with other units via a field bus, comprising:

a device provided in the central unit for producing a system clock;

a vacant line provided in the field bus for distributing said system clock to the other units;

a clock generator or transmitter provided in the other units, and respective multiplication devices located at the other units for multiplying said system clock.

2. The device for synchronizing processes according to claim 1, wherein said system clock serves for determining at least one value of a machine including rotational speed, acceleration, and angular position of the machine.

3. The device for synchronizing processes according to claim 2, wherein said at least one determined value is feedable to the further units by a bus system.

4. The device for synchronizing processes according to claim 1, wherein maid multiplication device have a filtering device.

5. The device for synchronizing processes according to claim 1, wherein said multiplication devices have a device for recognizing an absolute time check.

6. The device for synchronizing processes according to claim 1, wherein said multiplication devices have a quartz-stabilized frequency generator.

7. The device for synchronizing processes according to claim 2, wherein said multiplication devices serve far producing a module clock for processes taking place in the other units.

8. The device for synthesizing processes according to claim 7, wherein said module clock is adjustable in accordance with the process taking place in the respective other units.

9. The device for synthesizing processes according to claim 3, wherein said bus system for distributing said system clock is a local bus system.

10. A method of synchronizing processes which run on a central unit and on other units, which comprises:

generating a system clock in the central unit;

generating module clocks in the other units;

providing the system clock, which has been produced in the central unit, for synchronizing the module clock which has been produced in the other units; and at regular intervals, synchronizing the other units to an absolute time.

11. The method according to claim 10, which includes applying the module clock present in the units, which are involved, for processes taking place therein.

12. The method according to claim 10, which includes, upon failure of the system clock, driving down the processes led by the module clock, which are conducted through the further involved units.

13. The method according to claim 10, which includes adjusting the frequency of the module clock in accordance with an operation being performed thereat.

14. The method according to claim 10, which includes determining values of a machine, such as rotational speed, acceleration, and angular position simultaneously with the system clock.

15. The method according to claim 10, which includes forwarding the determined values together with the determined instant of time to the other units.

16. The method according to claim 10, which includes determining the values of the machine by a mathematical model in the involved units after the transmission via the central unit for the time-duration until the transmission of the next current values.

17. The method according to claim 10, which includes transmitting an absolute time from a central computer unit to involved computer unit, after a defined number of subdivided system clocks.

* * * * *